United States Patent [19]

Bracco et al.

[11] Patent Number: 5,518,753
[45] Date of Patent: May 21, 1996

[54] TRIGLYCERIDE MIXTURES AND FOODS BASED THEREON

[75] Inventors: Umberto Bracco, Vevey; Eric Coiffier, La Tour-de-Peilz, both of Switzerland

[73] Assignee: Nestec S.A., Vevey, Switzerland

[21] Appl. No.: 255,389

[22] Filed: Jun. 8, 1994

[30] Foreign Application Priority Data

Aug. 20, 1993 [EP] European Pat. Off. ............ 93113326

[51] Int. Cl.$^6$ ........................................... A23D 7/00
[52] U.S. Cl. ............................................ 426/601; 426/606
[58] Field of Search .................................. 426/601, 606

[56] References Cited

U.S. PATENT DOCUMENTS

| | | |
|---|---|---|
| 4,454,159 | 6/1984 | Musher . |
| 4,526,793 | 7/1985 | Ingenbleek . |
| 4,614,663 | 9/1986 | Rule .............................. 426/601 |
| 4,874,629 | 10/1989 | Chang .......................... 426/601 |
| 4,938,984 | 7/1990 | Traiter et al. . |
| 4,970,235 | 11/1990 | Traitler et al. . |
| 4,996,072 | 2/1991 | Marschner .................... 426/601 |
| 5,023,100 | 6/1991 | Chang ........................... 426/601 |
| 5,104,677 | 4/1992 | Behr ............................. 426/804 |
| 5,169,669 | 12/1992 | Haynes .......................... 426/601 |
| 5,178,873 | 1/1993 | Horrobin ...................... 424/422 |
| 5,223,285 | 6/1993 | DeMichele ................... 426/800 |
| 5,234,699 | 8/1993 | Yeo ............................... 426/607 |
| 5,234,702 | 8/1993 | Katz ............................. 426/541 |
| 5,308,832 | 5/1994 | Garleb ........................... 426/800 |
| 5,445,822 | 8/1995 | Bracco . |

FOREIGN PATENT DOCUMENTS

| | | |
|---|---|---|
| 0326198A2 | 8/1989 | European Pat. Off. . |
| 0340635A2 | 11/1989 | European Pat. Off. . |
| 0404058A2 | 12/1990 | European Pat. Off. . |
| 0430870A1 | 6/1991 | European Pat. Off. . |
| 0484266A3 | 5/1992 | European Pat. Off. . |
| 0484266A2 | 5/1992 | European Pat. Off. . |
| 0494707A1 | 7/1992 | European Pat. Off. . |
| 0517425A | 12/1992 | European Pat. Off. . |
| 2202726 | 10/1988 | United Kingdom . |
| 9300019 | 1/1993 | WIPO . |

OTHER PUBLICATIONS

Derwent Abstract, WPI Accesion No. 91–001137/01 of European Patent Application Publication No. 0404058A2.
Derwent Abstract, WPI Accesion No. 91–166322/23 of European Patent Application Publication No.0 430 870 A1.

*Primary Examiner*—Carolyn Paden
*Attorney, Agent, or Firm*—Vogt & O'Donnel

[57] ABSTRACT

An edible fatty acid triglyceride mixture contains from 50% to 70% by weight monounsaturated fatty acids, up to 10% by weight saturated fatty acids, and from 30% to 40% by weight polyunsaturated fatty acids. The polyunsaturated fatty acids include from 0.2% to 1% by weight C18:3,n-6, from 1.5% to 4% by weight C18:,n-3; from 0.1% to 0.5% by weight C18:4,n-3; from 0.2% to 1% by weight C20:5,n-3; and from 0.1% to 0.8% by weight C22:6,n-3. 25% to 35% by weight of the fatty acids of the triglycerides are n-6 fatty acids and the weight ratio of n-6 to n-3 fatty acids is from 4.5:1 to 8.5:1. The triglyceride mixture may be incorporated into a food composition as a fat substitute, e.g., in an amount of from 1% to 80% by weight.

11 Claims, No Drawings

TRIGLYCERIDE MIXTURES AND FOODS BASED THEREON

BACKGROUND OF THE INVENTION

This invention relates to a lipidic composition intended for use as a food or in food products.

Apart from their function as an energy source, lipids perform several functions in nutrition as a source of essential fatty acids:

- as components crucial to the cell structure and to the membranal functions,
- as precursors of eicosanoidal metabolites which figure in numerous physiological systems, such as the cardiovascular, immune, respiratory and digestive systems,
- as blood lipid regulators.

The physiological response to the consumption of edible oils depends upon the fatty acid composition of the oils. The fatty acids are classified into different families, n-9, n-6 and n-3, according to their structure, i.e., in dependence upon the presence and position of the double bonds in the carbon chain. Each family has its own specific activity, although there are interactions between the various families during the metabolism. In the case of blood lipid control, several criteria have to be taken into consideration, namely:

- the contribution in food terms made by saturated fatty acids should be limited on account of their effect on the increase in cholesterol and total lipids,
- an excessively high content of polyunsaturated fatty acids in the regime is undesirable due on the one hand to their negative effect on the cholesterol of beneficial high-density lipoproteins (HDL) and, on the other hand, to the risks associated with the peroxidation of fatty acids which has adverse effects at the cell level,
- monounsaturated fatty acids do not involve the risks mentioned above and have a favourable effect on reduction of the cholesterol of the troublesome low-density lipoproteins (LDL),
- the physiological functions of the fatty acids also differ within one and the same family, depending on the length of the carbon chain. For example, in the n-6 family of fatty acids, there is one fatty acid, namely gamma-linolenic acid (GLA), which has a more pronounced activity than the other members on blood lipid control. The same applies to eicosapentaenoic acid (EPA) in the n-3 family.

SUMMARY OF THE INVENTION

The problem addressed by the present invention was to provide a nutritional lipidic composition based on a combination of oils treated to guarantee optimal structural and physiological performance qualities with an optimal balance of active substances to avoid unbalanced metabolic loads.

The lipidic composition according to the invention is characterized in that the fatty acids of the triglycerides contain at most 10% by weight of saturated fatty acids, 50 to 70% by weight of monounsaturated fatty acids and 30 to 40% by weight of polyunsaturated fatty acids, in that the n-6 fatty acids make up 25 to 35%, in that the ratio by weight of fatty acids belonging to the n-6 family to those belonging to the n-3 family is 4.5:1 to 8.5:1 and in that the polyunsaturated fatty acids contain an effective quantity of acids belonging to the n-3 and n-6 families with a degree of unsaturation of 3 or more.

The present invention also includes a food containing the lipidic composition described herein and its use as a food or in foods.

The present invention also includes a process for the production of the lipidic composition described herein characterized in that an antioxidant is incorporated in the oil rich in monounsaturated fatty acids, in that the various oils are mixed at temperatures not exceeding 30° C. and in that the mixture is packed in containers in an inert atmosphere.

DETAILED DESCRIPTION OF THE INVENTION, INCLUDING PREFERRED EMBODIMENTS

The lipidic composition according to the invention takes into account not only the activities of the essential fatty acids, but also the interaction of each essential fatty acid of the n-6 family, for example linoleic acid, with its homolog of the n-3 family, for example alpha-linolenic acid, and a possible enzyme deficiency preventing these fatty acids from being converted into upper desaturated C 20 derivatives due to the lack of enzymatic capacity to desaturate these acids.

The composition of the present invention contains an oil rich in oleic acid which has an effect in terms of structure and as a vehicle on the essential bioactive fatty acids while being neutral from the point of view of bioactivity. The high oleic acid content provides the lipid mixture with high stability to oxidation and to photo-oxidation which avoids the formation of active oxygenated radicals.

The oils of choice which satisfy this requirement are preferably olive oil, apricot oil and hybrids of sunflower and safflower with a high oleic acid content, for example >60% by weight. They also include the oleins of vegetable oils, for example palm oil, obtained by dry, solvent or surfactant fractionation of oils and vegetable fats.

The oil in question makes up from 45 to 68% by weight, for example around 50% by weight, of the final lipid mixture.

The composition contains oils supplying the essential fatty acids belonging to the n-6 and n-3 families in a ratio which takes into account the greater reactivity of those of the n-3 family.

The oils rich in fatty acids of the n-6 family are selected from those rich in linoleic acid, preferably containing more than 60% by weight of that acid in relation to the total fatty acids, for example sunflower oil, grapeseed oil, passion flower oil, tomato oil or safflower oil. Among the oils of the n-6 family, the composition contains those which are capable of providing an effective quantity of acid with a degree of unsaturation of at least 3, for example gamma-linolenic acid, of which the function is to compensate the insufficiency of desaturases. The oils in question include evening primrose oil, borage oil and, preferably, blackcurrant seed oil.

Oils supplying the fatty acids of the n-3 family include those which preferably contain more than 20% by weight of alpha-linolenic acid, based on the total fatty acids, for example rapeseed oil, chia oil, linseed oil, kiwi oil, lucerne oil or rosa mosqueta oil. The oils in question also include those which provide the acids EPA and DHA, for example the oil of marine organisms.

The mean fatty acid composition of the principal triglycerides of the final composition is as follows:

| Fatty acid | % by weight | | % by weight |
|---|---|---|---|
| C16:0 | 3–8 | preferably | 5 |
| C18:0 | 1–5 | " | 3 |
| C18:1 | 50–65 | " | 59 |
| C18:2 | 20–35 | " | 26 |
| C18:3, n-6 (gamma) | 0.2–1 | " | 0.5 |
| C18:3, n-3 (alpha) | 1.5–4 | " | 3 |
| C18:4, n-3 | 0.1–0.5 | " | 0.2 |
| C20:5, n-3 (EPA) | 0.2–1 | " | 0.6 |
| C22:6, n-3 (DHA) | 0.1–0.8 | " | 0.4 |

On the basis of their respective fatty acid compositions, mixtures of the following oils are preferred:

| Oil | % by weight | | % by weight |
|---|---|---|---|
| Hybrid sunflower oil, hybrid safflower oil rich in oleic acid, olive oil, apricot oil or olein fractions | 45–68 | preferably | 50 |
| Sunflower oil or grape seed oil, passion flower oil, tomato oil or safflower oil | 8–28 | " | 20 |
| Blackcurrant seed oil, borage oil or evening primrose oil | 1–10 | " | 3 |
| Fish oil | 1–8 | " | 3 |
| Rapeseed oil, linseed oil, kiwi oil, lucerne oil, chia oil or rosa mosqueta oil | 2–30 | " | 24 |

The composition according to the invention may also contain other oils in small quantities, for example with a view to improving its keeping properties, for example a cereal germ oil rich in vitamin E as antioxidant.

The composition according to the invention may also contain fat-soluble or fat-solubilized antioxidants, for example a mixture of ascorbic and/or citric acid, lecithin, tocopherol and vitamin B.

The lipidic composition according to the invention is advantageously used for individual consumption as a table oil, but also in various foods such as, for example, salad creams, mayonnaises, milk products, for example yoghurts, milk substitutes, cream sauces, sweet or sour creams, ice creams, desert creams, confectionery, pâtisserie or biscuits, in which it completely or partly replaces the fats of these products, for example milk fats. Thus, the fatty acid composition of the daily food ration could be optimized by direct intake of the lipidic composition according to the invention and by indirect intake in the form of manufactured products.

In such a food, the lipidic composition according to the invention may make up from 1 to 80% by weight and preferably from 5 to 60% by weight.

EXAMPLES

The invention is illustrated by the following Examples in which percentages and parts are by weight, unless otherwise indicated.

Example 1

The following refined oils in the proportions indicated are mixed with stirring under nitrogen in the decreasing order of their respective quantities. Antioxidants are incorporated before mixing in hybrid sunflower oil as a mother solution.

| Oil | % |
|---|---|
| Hybrid sunflower oil containing 77.4% by weight of oleic acid, based on the fatty acids (HOSFO) | 50 |
| Rapeseed oil | 24 |
| Sunflower oil (SFO) | 20 |
| Blackcurrant seed oil | 3 |
| Fish oil | 3 |

To this end, the blackcurrant seed oil and the fish oil are added to the hybrid sunflower, rapeseed and standard sunflower oils in a stainless steel reactor equipped with a double jacket system for the circulation of temperature control fluids and with a variable speed stirrer, temperatures above 30° C. being avoided. The hybrid sunflower oil acts as mother solution for an antioxidant, for example vitamin E (tocopherol and its esters), a natural extract with an antioxidant effect (for example spices) in quantities of up to 1,000 ppm (parts per million) based on the oil mixture. In a closed circuit, the mixture is packed in laminated-surface drums, preferably with a capacity of 25 kg, in a nitrogen atmosphere to avoid the oxidative degradations associated with the unsaturation of the mixture.

The composition of the mixture is shown in Table 1 below.

TABLE 1

| Fatty acids (in %) | HOSFO | SFO | Blackcurrant oil | Fish oil | Rape oil | Mixture |
|---|---|---|---|---|---|---|
| C14:0 | | | | 5.7 | | 0.17 |
| C16:0 | 4.0 | 6.5 | 6.2 | 12.5 | 4.9 | 5.04 |
| C16:1 | | 0.1 | 0.4 | 7.4 | 0.2 | 0.30 |
| C18:0 | 3.8 | 4.2 | 1.5 | 1.7 | 1.7 | 3.24 |
| C18:1 | 77.4 | 25.5 | 12.9 | 11.7 | 59.3 | 58.77 |
| C18:2 (n-6) | 13.3 | 63.0 | 45.7 | 1.3 | 22.6 | 26.08 |
| C18:3 (n-3) | 0.1 | | 13.9 | 0.9 | 9.6 | 2.80 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.7 | 0.27 |
| C20:1 | 0.2 | | 0.5 | 5.5 | 0.9 | 0.50 |
| C20:5 (n-3) | | | | 19.5 | | 0.58 |
| C22:0 | 1.0 | 0.6 | | | 0.1 | 0.64 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 50 | 20 | 3 | 3 | 24 | 100 |
| Saturated FA (%) | | | | | | 9.37 |
| Monounsat. FA (%) | | | | | | 59.69 |
| Polyunsat. FA (%) | | | | | | 30.60 |
| Total n-6 FA (%) | | | | | | 26.58 |
| Total n-3 FA (%) | | | | | | 4.02 |
| n-6/n-3 ratio | | | | | | 6.61 |

Examples 2–22

The mixture of oils is prepared in the same way as in Example 1. The composition of the mixture is shown in Tables 2 to 22 below.

TABLE 2

| Fatty acids (in %) | HOSFO | SFO | Black-currant oil | Fish oil | Rape oil | Mixture |
|---|---|---|---|---|---|---|
| C14:0 | | | | 5.7 | | 0.11 |
| C16:0 | 4.0 | 6.5 | 6.2 | 12.5 | 4.9 | 4.95 |
| C16:1 | | 0.1 | 0.4 | 7.4 | 0.2 | 0.23 |
| C18:0 | 3.8 | 4.2 | 1.5 | 1.7 | 1.7 | 3.25 |
| C18:1 | 77.4 | 25.5 | 12.9 | 11.7 | 59.3 | 59.71 |
| C18:2 (n-6) | 13.3 | 63.0 | 45.7 | 1.3 | 22.6 | 26.07 |
| C18:3 (n-3) | 0.1 | | 13.9 | 0.9 | 9.6 | 2.84 |
| C18:3 (n-6) | | 0.1 | 15.7 | 0.2 | | 0.34 |
| C18:4 (n-3) | | | 3.0 | 3.5 | | 0.13 |
| C20:0 | 0.2 | | | 0.1 | 0.7 | 0.28 |
| C20:1 | 0.2 | 0.5 | 5.5 | 0.9 | 0.45 | 0.39 |
| C20:5 (n-3) | | | | 19.5 | | 0.39 |
| C22:0 | 1.0 | 0.6 | | | 0.1 | 0.65 |
| C22:1 | | | | 4.0 | | 0.08 |
| C22:5 (n-3) | | | | 2.6 | | 0.05 |
| C22:6 (n-3) | | | | 12.2 | | 0.24 |
| % Oil | 50 | 20 | 2 | 2 | 26 | 100 |
| Saturated FA (%) | | | | | | 9.24 |
| Monounsat. FA (%) | | | | | | 60.47 |
| Polyunsat. FA (%) | | | | | | 30.06 |
| Total n-6 FA (%) | | | | | | 26.40 |
| Total n-3 FA (%) | | | | | | 3.66 |
| n-6/n-3 ratio | | | | | | 7.22 |

TABLE 3

| Fatty acids (in %) | HOSFO | SFO | Black-currant oil | Fish oil | Rape oil | Mixture |
|---|---|---|---|---|---|---|
| C14:0 | | | | 5.7 | | 0.23 |
| C16:0 | 4.0 | 6.5 | 6.2 | 12.5 | 4.9 | 5.13 |
| C16:1 | | 0.1 | 0.4 | 7.4 | 0.2 | 0.38 |
| C18:0 | 3.8 | 4.2 | 1.5 | 1.7 | 1.7 | 3.24 |
| C18:1 | 77.4 | 25.5 | 12.9 | 11.7 | 59.3 | 57.83 |
| C18:2 (n-6) | 13.3 | 63.0 | 45.7 | 1.3 | 22.6 | 26.10 |
| C18:3 (n-3) | 0.1 | | 13.9 | 0.9 | 9.6 | 2.75 |
| C18:3 (n-6) | | 0.1 | 15.7 | 0.2 | | 0.66 |
| C18:4 (n-3) | | | 3.0 | 3.5 | | 0.26 |
| C20:0 | 0.2 | | | 0.1 | 0.7 | 0.26 |
| C20:1 | 0.2 | | 0.5 | 5.5 | 0.9 | 0.54 |
| C20:5 (n-3) | | | | 19.5 | | 0.78 |
| C22:0 | 1.0 | 0.6 | | | 0.1 | 0.64 |
| C22:1 | | | | 4.0 | | 0.16 |
| C22:5 (n-3) | | | | 2.6 | | 0.10 |
| C22:6 (n-3) | | | | 12.2 | | 0.49 |
| % Oil | 50 | 20 | 4 | 4 | 22 | 100 |
| Saturated FA (%) | | | | | | 9.50 |
| Monounsat. FA (%) | | | | | | 58.90 |
| Polyunsat. FA (%) | | | | | | 31.14 |
| Total n-6 FA (%) | | | | | | 26.76 |
| Total n-3 FA (%) | | | | | | 4.39 |
| n-6/n-3 ratio | | | | | | 6.10 |

TABLE 4

| Fatty acids (in %) | HOSFO | SFO | Black-currant oil | Fish oil | Rape oil | Mixture |
|---|---|---|---|---|---|---|
| C14:0 | | | | 5.7 | | 0.29 |
| C16:0 | 4.0 | 6.5 | 6.2 | 12.5 | 4.9 | 5.21 |
| C16:1 | | 0.1 | 0.4 | 7.4 | 0.2 | 0.45 |
| C18:0 | 3.8 | 4.2 | 1.5 | 1.7 | 1.7 | 3.24 |
| C18:1 | 77.4 | 25.5 | 12.9 | 11.7 | 59.3 | 56.89 |
| C18:2 (n-6) | 13.3 | 63.0 | 45.7 | 1.3 | 22.6 | 26.12 |
| C18:3 (n-3) | 0.1 | | 13.9 | 0.9 | 9.6 | 2.71 |
| C18:3 (n-6) | | 0.1 | 15.7 | 0.2 | | 0.81 |
| C18:4 (n-3) | | | 3.0 | 3.5 | | 0.33 |
| C20:0 | 0.2 | | | 0.1 | 0.7 | 0.24 |
| C20:1 | 0.2 | | 0.5 | 5.5 | 0.9 | 0.58 |
| C20:5 (n-3) | | | | 19.5 | | 0.97 |
| C22:0 | 1.0 | 0.6 | | | 0.1 | 0.64 |
| C22:1 | | | | 4.0 | | 0.20 |
| C22:5 (n-3) | | | | 2.6 | | 0.13 |
| C22:6 (n-3) | | | | 12.2 | | 0.61 |
| % Oil | 50 | 20 | 5 | 5 | 20 | 100 |
| Saturated FA (%) | | | | | | 9.63 |
| Monounsat. FA (%) | | | | | | 58.12 |
| Polyunsat. FA (%) | | | | | | 31.69 |
| Total n-6 FA (%) | | | | | | 26.94 |
| Total n-3 FA (%) | | | | | | 4.75 |
| n-6/n-3 ratio | | | | | | 5.67 |

TABLE 5

| Fatty acids (in %) | HOSFO | Tomato oil | Black-currant oil | Fish oil | Rape oil | Mixture |
|---|---|---|---|---|---|---|
| C14:0 | | 0.3 | | 5.7 | | 0.23 |
| C16:0 | 4.0 | 12.9 | 6.2 | 12.5 | 4.9 | 6.32 |
| C16:1 | | 0.1 | 0.4 | 7.4 | 0.2 | 0.30 |
| C18:0 | 3.8 | 4.4 | 1.5 | 1.7 | 1.7 | 3.28 |
| C18:1 | 77.4 | 19.0 | 12.9 | 11.7 | 59.3 | 57.47 |
| C18:2 (n-6) | 13.3 | 60.9 | 45.7 | 1.3 | 22.6 | 25.66 |
| C18:3 (n-3) | 0.1 | 2.1 | 13.9 | 0.9 | 9.6 | 3.22 |
| C18:3 (n-6) | | | 15.7 | 0.2 | | 0.48 |
| C18:4 (n-3) | | | 3.0 | 3.5 | | 0.20 |
| C20:0 | 0.2 | | | 0.1 | 0.7 | 0.27 |
| C20:1 | 0.2 | | 0.5 | 5.5 | 0.9 | 0.50 |
| C20:5 (n-3) | | | | 19.5 | | 0.58 |
| C22:0 | 1.0 | | | | 0.1 | 0.52 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 50 | 20 | 3 | 3 | 24 | 100 |
| Saturated FA (%) | | | | | | 10.63 |
| Monounsat. FA (%) | | | | | | 58.39 |
| Polyunsat. FA (%) | | | | | | 30.58 |
| Total n-6 FA (%) | | | | | | 26.14 |
| Total n-3 FA (%) | | | | | | 4.44 |
| n-6/n-3 ratio | | | | | | 5.88 |

TABLE 6

| Fatty acids (in %) | HOSFO | Passion flower oil | Black-currant oil | Fish oil | Rape oil | Mixture |
|---|---|---|---|---|---|---|
| C14:0 | | 0.3 | | 5.7 | | 0.17 |
| C16:0 | 4.0 | 11.0 | 6.2 | 12.5 | 4.9 | 5.94 |
| C16:1 | | 0.1 | 0.4 | 7.4 | 0.2 | 0.30 |
| C18:0 | 3.8 | 2.6 | 1.5 | 1.7 | 1.7 | 2.92 |

TABLE 6-continued

| Fatty acids (in %) | HOSFO | Passion flower oil | Black-currant oil | Fish oil | Rape oil | Mixture |
|---|---|---|---|---|---|---|
| C18:1 | 77.4 | 15.0 | 12.9 | 11.7 | 59.3 | 56.67 |
| C18:2 (n-6) | 13.3 | 70.9 | 45.7 | 1.3 | 22.6 | 27.66 |
| C18:3 (n-3) | 0.1 | 0.4 | 13.9 | 0.9 | 9.6 | 2.88 |
| C18:3 (n-6) | | | 15.7 | 0.2 | | 0.48 |
| C18:4 (n-3) | | | 3.0 | 3.5 | | 0.20 |
| C20:0 | 0.2 | | | 0.1 | 0.7 | 0.27 |
| C20:1 | 0.2 | | 0.5 | 5.5 | 0.9 | 0.50 |
| C20:5 (n-3) | | | | 19.5 | | 0.58 |
| C22:0 | 1.0 | | | | 0.1 | 0.52 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 50 | 20 | 3 | 3 | 24 | 100 |
| Saturated FA (%) | | | | | | 9.83 |
| Monounsat. FA (%) | | | | | | 57.59 |
| Polyunsat. FA (%) | | | | | | 32.24 |
| Total n-6 FA (%) | | | | | | 28.14 |
| Total n-3 FA (%) | | | | | | 4.10 |
| n-6/n-3 ratio | | | | | | 6.86 |

TABLE 7

| Fatty acids (in %) | Apricot oil | SFO | Black-currant oil | Fish oil | Rape oil | Mixture |
|---|---|---|---|---|---|---|
| C14:0 | | | | 5.7 | | 0.17 |
| C16:0 | 4.8 | 6.5 | 6.2 | 12.5 | 4.9 | 5.28 |
| C16:1 | 0.7 | 0.1 | 0.4 | 7.4 | 0.2 | 0.66 |
| C18:0 | 1.1 | 4.2 | 1.5 | 1.7 | 1.7 | 1.64 |
| C18:1 | 62.5 | 25.5 | 12.9 | 11.7 | 59.3 | 54.70 |
| C18:2 (n-6) | 30.8 | 63.0 | 45.7 | 1.3 | 22.6 | 30.79 |
| C18:3 (n-3) | 0.1 | | 13.9 | 0.9 | 9.6 | 3.76 |
| C18:3 (n-6) | | 0.1 | 15.7 | 0.2 | | 0.49 |
| C18:4 (n-3) | | | 3.0 | 3.5 | | 0.20 |
| C20:0 | | | | 0.1 | 0.7 | 0.24 |
| C20:1 | | | 0.5 | 5.5 | 0.9 | 0.49 |
| C20:5 (n-3) | | | | 19.5 | | 0.58 |
| C22:0 | | 0.6 | | | 0.1 | 0.09 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 50 | 10 | 3 | 3 | 34 | 100 |
| Saturated FA (%) | | | | | | 7.43 |
| Monounsat. FA (%) | | | | | | 55.97 |
| Polyunsat. FA (%) | | | | | | 36.26 |
| Total n-6 FA (%) | | | | | | 31.28 |
| Total n-3 FA (%) | | | | | | 4.98 |
| n-6/n-3 ratio | | | | | | 6.28 |

TABLE 8

| Fatty acids (in %) | HOSFO | SFO | Black-currant oil | Fish oil | Kiwi oil | Mixture |
|---|---|---|---|---|---|---|
| C14:0 | | | | 5.7 | | 0.17 |
| C16:0 | 4.0 | 6.5 | 6.2 | 12.5 | 5.0 | 5.03 |
| C16:1 | | 0.1 | 0.4 | 7.4 | | 0.26 |
| C18:0 | 3.8 | 4.2 | 1.5 | 1.7 | 2.5 | 3.74 |
| C18:1 | 77.4 | 25.5 | 12.9 | 11.7 | 11.9 | 57.52 |
| C18:2 (n-6) | 13.3 | 63.0 | 45.7 | 1.3 | 15.0 | 27.38 |
| C18:3 (n-3) | 0.1 | | 13.9 | 0.9 | 64.3 | 2.44 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.4 | 0.14 |
| C20:1 | 0.2 | | 0.5 | 5.5 | 0.3 | 0.32 |
| C20:5 (n-3) | | | | 19.5 | | 0.58 |
| C22:0 | 1.0 | 0.6 | | | 0.2 | 0.81 |
| C22:1 | | | | 4.0 | 0.1 | 0.12 |
| C22:5 (n-3) | | | | 2.6 | | 0.08 |
| C22:6 (n-3) | | | | 12.2 | | 0.37 |
| % Oil | 64 | 27 | 3 | 3 | 3 | 100 |
| Saturated FA (%) | | | | | | 9.88 |
| Monounsat. FA (%) | | | | | | 58.22 |
| Polyunsat. FA (%) | | | | | | 31.55 |
| Total n-6 FA (%) | | | | | | 27.89 |
| Total n-3 FA (%) | | | | | | 3.66 |
| n-6/n-3 ratio | | | | | | 7.62 |

TABLE 9

| Fatty acids (in %) | HOSFO | SFO | Black-currant oil | Fish oil | Kiwi oil | Mixture |
|---|---|---|---|---|---|---|
| C14:0 | | | | 5.7 | | 0.17 |
| C16:0 | 4.0 | 6.5 | 6.2 | 12.5 | 5.0 | 5.01 |
| C16:1 | | 0.1 | 0.4 | 7.4 | | 0.26 |
| C18:0 | 3.8 | 4.2 | 1.5 | 1.7 | 2.5 | 3.72 |
| C18:1 | 77.4 | 25.5 | 12.9 | 11.7 | 11.9 | 57.38 |
| C18:2 (n-6) | 13.3 | 63.0 | 45.7 | 1.3 | 15.0 | 26.90 |
| C18:3 (n-3) | 0.1 | | 13.9 | 0.9 | 64.3 | 3.08 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.4 | 0.15 |
| C20:1 | 0.2 | | 0.5 | 5.5 | 0.3 | 0.32 |
| C20:5 (n-3) | | | | 19.5 | | 0.58 |
| C22:0 | 1.0 | 0.6 | | | 0.2 | 0.80 |
| C22:1 | | | | 4.0 | 0.1 | 0.12 |
| C22:5 (n-3) | | | | 2.6 | | 0.08 |
| C22:6 (n-3) | | | | 12.2 | | 0.37 |
| % Oil | 64 | 26 | 3 | 3 | 4 | 100 |
| Saturated FA (%) | | | | | | 9.85 |
| Monounsat. FA (%) | | | | | | 58.08 |
| Polyunsat. FA (%) | | | | | | 31.71 |
| Total n-6 FA (%) | | | | | | 27.41 |
| Total n-3 FA (%) | | | | | | 4.30 |
| n-6/n-3 ratio | | | | | | 6.37 |

TABLE 10

| Fatty acids (in %) | HOSFO | SFO | Black-currant oil | Fish oil | Kiwi oil | Mixture |
|---|---|---|---|---|---|---|
| C14:0 | | | | 5.7 | | 0.23 |
| C16:0 | 4.0 | 6.5 | 6.2 | 12.5 | 5.0 | 5.07 |
| C16:1 | | 0.1 | 0.4 | 7.4 | | 0.34 |
| C18:0 | 3.8 | 4.2 | 1.5 | 1.7 | 2.5 | 3.67 |
| C18:1 | 77.4 | 25.5 | 12.9 | 11.7 | 11.9 | 57.12 |
| C18:2 (n-6) | 13.3 | 63.0 | 45.7 | 1.3 | 15.0 | 26.11 |
| C18:3 (n-3) | 0.1 | | 13.9 | 0.9 | 64.3 | 3.23 |
| C18:3 (n-6) | | 0.1 | 15.7 | 0.2 | | 0.66 |

TABLE 10-continued

| Fatty acids (in %) | HOSFO | SFO | Black-currant oil | Fish oil | Kiwi oil | Mixture |
|---|---|---|---|---|---|---|
| C18:4 (n-3) | | | 3.0 | 3.5 | | 0.26 |
| C20:0 | 0.2 | | | 0.1 | 0.4 | 0.15 |
| C20:1 | 0.2 | | 0.5 | 5.5 | 0.3 | 0.38 |
| C20:5 (n-3) | | | | 19.5 | | 0.78 |
| C22:0 | 1.0 | 0.6 | | | 0.2 | 0.79 |
| C22:1 | | | | 4.0 | 0.1 | 0.16 |
| C22:5 (n-3) | | | | 2.6 | | 0.10 |
| C22:6 (n-3) | | | | 12.2 | | 0.49 |
| % Oil | 64 | 24 | 4 | 4 | 4 | 100 |
| Saturated FA (%) | | | | | | 9.90 |
| Monounsat. FA (%) | | | | | | 58.00 |
| Polyunsat. FA (%) | | | | | | 31.63 |
| Total n-6 FA (%) | | | | | | 26.77 |
| Total n-3 FA (%) | | | | | | 4.86 |
| n-6/n-3 ratio | | | | | | 5.51 |

TABLE 11

| Fatty acids (in %) | HOSFO | SFO | Black-currant oil | Fish oil | Kiwi oil | Mixture |
|---|---|---|---|---|---|---|
| C14:0 | | | | 5.7 | | 0.29 |
| C16:0 | 4.0 | 6.5 | 6.2 | 12.5 | 5.0 | 5.12 |
| C16:1 | | 0.1 | 0.4 | 7.4 | | 0.41 |
| C18:0 | 3.8 | 4.2 | 1.5 | 1.7 | 2.5 | 3.62 |
| C18:1 | 77.4 | 25.5 | 12.9 | 11.7 | 11.9 | 56.85 |
| C18:2 (n-6) | 13.3 | 63.0 | 45.7 | 1.3 | 15.0 | 25.32 |
| C18:3 (n-3) | 0.1 | | 13.9 | 0.9 | 64.3 | 3.38 |
| C18:3 (n-6) | | 0.1 | 15.7 | 0.2 | | 0.82 |
| C18:4 (n-3) | | | 3.0 | 3.5 | | 0.33 |
| C20:0 | 0.2 | | | 0.1 | 0.4 | 0.15 |
| C20:1 | 0.2 | | 0.5 | 5.5 | 0.3 | 0.44 |
| C20:5 (n-3) | | | | 19.5 | | 0.97 |
| C22:0 | 1.0 | 0.6 | | | 0.2 | 0.78 |
| C22:1 | | | | 4.0 | 0.1 | 0.20 |
| C22:5 (n-3) | | | | 2.6 | | 0.13 |
| C22:6 (n-3) | | | | 12.2 | | 0.61 |
| % Oil | 64 | 22 | 5 | 5 | 4 | 100 |
| Saturated FA (%) | | | | | | 9.96 |
| Monounsat. FA (%) | | | | | | 57.91 |
| Polyunsat. FA (%) | | | | | | 31.55 |
| Total n-6 FA (%) | | | | | | 26.14 |
| Total n-3 FA (%) | | | | | | 5.42 |
| n-6/n-3 ratio | | | | | | 4.83 |

TABLE 12

| Fatty acids (in %) | HOSFO | SFO | Black-currant oil | Fish oil | Chia oil | Mixture |
|---|---|---|---|---|---|---|
| C14:0 | | | | 5.7 | | 0.17 |
| C16:0 | 4.0 | 6.5 | 6.2 | 12.5 | 7.0 | 5.09 |
| C16:1 | | 0.1 | 0.4 | 7.4 | | 0.26 |
| C18:0 | 3.8 | 4.2 | 1.5 | 1.7 | 3.6 | 3.77 |
| C18:1 | 77.4 | 25.5 | 12.9 | 11.7 | 7.6 | 57.39 |
| C18:2 (n-6) | 13.3 | 63.0 | 45.7 | 1.3 | 17.6 | 27.46 |
| C18:3 (n-3) | 0.1 | | 13.9 | 0.9 | 61.7 | 2.36 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.3 | 0.14 |
| C20:1 | 0.2 | | 0.5 | 5.5 | 0.3 | 0.32 |
| C20:5 (n-3) | | | | 19.5 | | 0.58 |
| C22:0 | 1.0 | 0.6 | | | | 0.80 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 27 | 3 | 3 | 3 | 100 |
| Saturated FA (%) | | | | | | 9.97 |
| Monounsat. FA (%) | | | | | | 58.09 |
| Polyunsat. FA (%) | | | | | | 31.55 |
| Total n-6 FA (%) | | | | | | 27.96 |
| Total n-3 FA (%) | | | | | | 3.58 |
| n-6/n-3 ratio | | | | | | 7.80 |

TABLE 13

| Fatty acids (in %) | HOSFO | SFO | Black-currant oil | Fish oil | Chia oil | Mixture |
|---|---|---|---|---|---|---|
| C14:0 | | | | 5.7 | | 0.17 |
| C16:0 | 4.0 | 6.5 | 6.2 | 12.5 | 7.0 | 5.09 |
| C16:1 | | 0.1 | 0.4 | 7.4 | | 0.26 |
| C18:0 | 3.8 | 4.2 | 1.5 | 1.7 | 3.6 | 3.76 |
| C18:1 | 77.4 | 25.5 | 12.9 | 11.7 | 7.6 | 57.21 |
| C18:2 (n-6) | 13.3 | 63.0 | 45.7 | 1.3 | 17.6 | 27.01 |
| C18:3 (n-3) | 0.1 | | 13.9 | 0.9 | 61.7 | 2.98 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.3 | 0.14 |
| C20:1 | 0.2 | | 0.5 | 5.5 | 0.3 | 0.32 |
| C20:5 (n-3) | | | | 19.5 | | 0.58 |
| C22:0 | 1.0 | 0.6 | | | | 0.80 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 26 | 3 | 3 | 4 | 100 |
| Saturated FA (%) | | | | | | 9.96 |
| Monounsat. FA (%) | | | | | | 57.91 |
| Polyunsat. FA (%) | | | | | | 31.71 |
| Total n-6 FA (%) | | | | | | 27.51 |
| Total n-3 FA (%) | | | | | | 4.20 |
| n-6/n-3 ratio | | | | | | 6.55 |

TABLE 14

| Fatty acids (in %) | HOSFO | SFO | Black-currant oil | Fish oil | Chia oil | Mixture |
|---|---|---|---|---|---|---|
| C14:0 | | | | 5.7 | | 0.23 |
| C16:0 | 4.0 | 6.5 | 6.2 | 12.5 | 7.0 | 5.15 |
| C16:1 | | 0.1 | 0.4 | 7.4 | | 0.34 |
| C18:0 | 3.8 | 4.2 | 1.5 | 1.7 | 3.6 | 3.71 |
| C18:1 | 77.4 | 25.5 | 12.9 | 11.7 | 7.6 | 56.94 |
| C18:2 (n-6) | 13.3 | 63.0 | 45.7 | 1.3 | 17.6 | 26.22 |
| C18:3 (n-3) | 0.1 | | 13.9 | 0.9 | 61.7 | 3.12 |
| C18:3 (n-6) | | 0.1 | 15.7 | 0.2 | | 0.66 |
| C18:4 (n-3) | | | 3.0 | 3.5 | | 0.26 |
| C20:0 | 0.2 | | | 0.1 | 0.3 | 0.14 |
| C20:1 | 0.2 | | 0.5 | 5.5 | 0.3 | 0.38 |
| C20:5 (n-3) | | | | 19.5 | | 0.78 |

TABLE 14-continued

| Fatty acids (in %) | HOSFO | SFO | Black-currant oil | Fish oil | Chia oil | Mixture |
|---|---|---|---|---|---|---|
| C22:0 | 1.0 | 0.6 | | | | 0.78 |
| C22:1 | | | | 4.0 | | 0.16 |
| C22:5 (n-3) | | | | 2.6 | | 0.10 |
| C22:6 (n-3) | | | | 12.2 | | 0.49 |
| % Oil | 64 | 24 | 4 | 4 | 4 | 100 |
| Saturated FA (%) | | | | | | 10.02 |
| Monounsat. FA (%) | | | | | | 57.82 |
| Polyunsat. FA (%) | | | | | | 31.63 |
| Total n-6 FA (%) | | | | | | 26.88 |
| Total n-3 FA (%) | | | | | | 4.76 |
| n-6/n-3 ratio | | | | | | 5.65 |

TABLE 15

| Fatty acids (in %) | HOSFO | SFO | Black-currant oil | Fish oil | Chia oil | Mixture |
|---|---|---|---|---|---|---|
| C14:0 | | | | 5.7 | | 0.29 |
| C16:0 | 4.0 | 6.5 | 6.2 | 12.5 | 7.0 | 5.21 |
| C16:1 | | 0.1 | 0.4 | 7.4 | | 0.41 |
| C18:0 | 3.8 | 4.2 | 1.5 | 1.7 | 3.6 | 3.66 |
| C18:1 | 77.4 | 25.5 | 12.9 | 11.7 | 7.6 | 56.68 |
| C18:2 (n-6) | 13.3 | 63.0 | 45.7 | 1.3 | 17.6 | 25.43 |
| C18:3 (n-3) | 0.1 | | 13.9 | 0.9 | 61.7 | 3.27 |
| C18:3 (n-6) | | 0.1 | 15.7 | 0.2 | | 0.82 |
| C18:4 (n-3) | | | | 3.0 | 3.5 | 0.33 |
| C20:0 | 0.2 | | | 0.1 | 0.3 | 0.15 |
| C20:1 | 0.2 | | 0.5 | 5.5 | 0.3 | 0.44 |
| C20:5 (n-3) | | | | 19.5 | | 0.97 |
| C22:0 | 1.0 | 0.6 | | | | 0.77 |
| C22:1 | | | | 4.0 | | 0.20 |
| C22:5 (n-3) | | | | 2.6 | | 0.13 |
| C22:6 (n-3) | | | | 12.2 | | 0.61 |
| % Oil | 64 | 22 | 5 | 5 | 4 | 100 |
| Saturated FA (%) | | | | | | 10.07 |
| Monounsat. FA (%) | | | | | | 57.73 |
| Polyunsat. FA (%) | | | | | | 31.56 |
| Total n-6 FA (%) | | | | | | 26.24 |
| Total n-3 FA (%) | | | | | | 5.31 |
| n-6/n-3 ratio | | | | | | 4.94 |

TABLE 16

| Fatty acids (in %) | HOSFO | SFO | Black-currant oil | Fish oil | Linseed oil | Mixture |
|---|---|---|---|---|---|---|
| C14:0 | | | | 5.7 | | 0.17 |
| C16:0 | 4.0 | 6.5 | 6.2 | 12.5 | 6.0 | 5.06 |
| C16:1 | | 0.1 | 0.4 | 7.4 | | 0.26 |
| C18:0 | 3.8 | 4.2 | 1.5 | 1.7 | 4.0 | 3.78 |
| C18:1 | 77.4 | 25.5 | 12.9 | 11.7 | 22.0 | 57.82 |
| C18:2 (n-6) | 13.3 | 63.0 | 45.7 | 1.3 | 16.0 | 27.41 |
| C18:3 (n-3) | 0.1 | | 13.9 | 0.9 | 52.0 | 2.07 |
| C18:3 (n-6) | | 0.1 | 15.7 | 0.2 | | 0.50 |
| C18:4 (n-3) | | | | 3.0 | 3.5 | 0.20 |
| C20:0 | 0.2 | | | 0.1 | | 0.13 |
| C20:1 | 0.2 | | 0.5 | 5.5 | | 0.31 |
| C20:5 (n-3) | | | | 19.5 | | 0.58 |
| C22:0 | 1.0 | 0.6 | | | | 0.80 |
| C22:1 | | | | 4.0 | | 0.12 |

TABLE 16-continued

| Fatty acids (in %) | HOSFO | SFO | Black-currant oil | Fish oil | Linseed oil | Mixture |
|---|---|---|---|---|---|---|
| C22:5 (n-3) | | | | 2.6 | | 0.08 |
| C22:6 (n-3) | | | | 12.2 | | 0.37 |
| % Oil | 64 | 27 | 3 | 3 | 3 | 100 |
| Saturated FA (%) | | | | | | 9.94 |
| Monounsat. FA (%) | | | | | | 58.51 |
| Polyunsat. FA (%) | | | | | | 31.21 |
| Total n-6 FA (%) | | | | | | 27.92 |
| Total n-3 FA (%) | | | | | | 3.29 |
| n-6/n-3 ratio | | | | | | 8.48 |

TABLE 17

| Fatty acids (in %) | HOSFO | SFO | Black-currant oil | Fish oil | Linseed oil | Mixture |
|---|---|---|---|---|---|---|
| C14:0 | | | | 5.7 | | 0.17 |
| C16:0 | 4.0 | 6.5 | 6.2 | 12.5 | 6.0 | 5.05 |
| C16:1 | | 0.1 | 0.4 | 7.4 | | 0.26 |
| C18:0 | 3.8 | 4.2 | 1.5 | 1.7 | 4.0 | 3.78 |
| C18:1 | 77.4 | 25.5 | 12.9 | 11.7 | 22.0 | 57.78 |
| C18:2 (n-6) | 13.3 | 63.0 | 45.7 | 1.3 | 16.0 | 26.94 |
| C18:3 (n-3) | 0.1 | | 13.9 | 0.9 | 52.0 | 2.59 |
| C18:3 (n-6) | | 0.1 | 15.7 | 0.2 | | 0.50 |
| C18:4 (n-3) | | | | 3.0 | 3.5 | 0.20 |
| C20:0 | 0.2 | | | 0.1 | | 0.13 |
| C20:1 | 0.2 | | 0.5 | 5.5 | | 0.31 |
| C20:5 (n-3) | | | | 19.5 | | 0.58 |
| C22:0 | 1.0 | 0.6 | | | | 0.80 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 26 | 3 | 3 | 4 | 100 |
| Saturated FA (%) | | | | | | 9.93 |
| Monounsat. FA (%) | | | | | | 58.47 |
| Polyunsat. FA (%) | | | | | | 31.26 |
| Total n-6 FA (%) | | | | | | 27.45 |
| Total n-3 FA (%) | | | | | | 3.81 |
| n-6/n-3 ratio | | | | | | 7.20 |

TABLE 18

| Fatty acids (in %) | HOSFO | SFO | Black-currant oil | Fish oil | Linseed oil | Mixture |
|---|---|---|---|---|---|---|
| C14:0 | | | | 5.7 | | 0.17 |
| C16:0 | 4.0 | 6.5 | 6.2 | 12.5 | 6.0 | 5.05 |
| C16:1 | | 0.1 | 0.4 | 7.4 | | 0.26 |
| C18:0 | 3.8 | 4.2 | 1.5 | 1.7 | 4.0 | 3.78 |
| C18:1 | 77.4 | 25.5 | 12.9 | 11.7 | 22.0 | 57.75 |
| C18:2 (n-6) | 13.3 | 63.0 | 45.7 | 1.3 | 16.0 | 26.47 |
| C18:3 (n-3) | 0.1 | | 13.9 | 0.9 | 52.0 | 3.11 |
| C18:3 (n-6) | | 0.1 | 15.7 | 0.2 | | 0.50 |
| C18:4 (n-3) | | | | 3.0 | 3.5 | 0.20 |
| C20:0 | 0.2 | | | 0.1 | | 0.13 |
| C20:1 | 0.2 | | 0.5 | 5.5 | | 0.31 |
| C20:5 (n-3) | | | | 19.5 | | 0.58 |
| C22:0 | 1.0 | 0.6 | | | | 0.79 |
| C22:1 | | | | 4.0 | | 0.12 |
| C22:5 (n-3) | | | | 2.6 | | 0.08 |
| C22:6 (n-3) | | | | 12.2 | | 0.37 |

TABLE 18-continued

| Fatty acids (in %) | HOSFO | SFO | Black-currant oil | Fish oil | Linseed oil | Mixture |
|---|---|---|---|---|---|---|
| % Oil | 64 | 25 | 3 | 3 | 5 | 100 |
| Saturated FA (%) | | | | | | 9.92 |
| Monounsat. FA (%) | | | | | | 58.44 |
| Polyunsat. FA (%) | | | | | | 31.31 |
| Total n-6 FA (%) | | | | | | 26.97 |
| Total n-3 FA (%) | | | | | | 4.33 |
| n-6/n-3 ratio | | | | | | 6.23 |

TABLE 19

| Fatty acids (in %) | HOSFO | SFO | Black-currant oil | Fish oil | Rosa mosqueta oil | Mixture |
|---|---|---|---|---|---|---|
| C14:0 | | | | 5.7 | | 0.17 |
| C16:0 | 4.0 | 6.5 | 6.2 | 12.5 | 3.2 | 4.87 |
| C16:1 | | 0.1 | 0.4 | 7.4 | 0.1 | 0.26 |
| C18:0 | 3.8 | 4.2 | 1.5 | 1.7 | 1.7 | 3.64 |
| C18:1 | 77.4 | 25.5 | 12.9 | 11.7 | 14.2 | 57.25 |
| C18:2 (n-6) | 13.3 | 63.0 | 45.7 | 1.3 | 46.3 | 27.82 |
| C18:3 (n-3) | 0.1 | | 13.9 | 0.9 | 33.3 | 2.51 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.9 | 0.18 |
| C20:1 | 0.2 | | 0.5 | 5.5 | 0.2 | 0.32 |
| C20:5 (n-3) | | | | 19.5 | | 0.58 |
| C22:0 | 1.0 | 0.6 | | | 0.1 | 0.79 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 24 | 3 | 3 | 6 | 100 |
| Saturated FA (%) | | | | | | 9.66 |
| Monounsat. FA (%) | | | | | | 57.95 |
| Polyunsat. FA (%) | | | | | | 32.05 |
| Total n-6 FA (%) | | | | | | 28.32 |
| Total n-3 FA (%) | | | | | | 3.73 |
| n-6/n-3 ratio | | | | | | 7.59 |

TABLE 20

| Fatty acids (in %) | HOSFO | SFO | Black-currant oil | Fish oil | Rosa mosqueta oil | Mixture |
|---|---|---|---|---|---|---|
| C14:0 | | | | 5.7 | | 0.17 |
| C16:0 | 4.0 | 6.5 | 6.2 | 12.5 | 3.2 | 4.81 |
| C16:1 | | 0.1 | 0.4 | 7.4 | 0.1 | 0.26 |
| C18:0 | 3.8 | 4.2 | 1.5 | 1.7 | 1.7 | 3.59 |
| C18:1 | 77.4 | 25.5 | 12.9 | 11.7 | 14.2 | 57.02 |
| C18:2 (n-6) | 13.3 | 63.0 | 45.7 | 1.3 | 46.3 | 27.49 |
| C18:3 (n-3) | 0.1 | | 13.9 | 0.9 | 33.3 | 3.17 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.9 | 0.20 |
| C20:1 | 0.2 | | 0.5 | 5.5 | 0.2 | 0.32 |
| C20:5 (n-3) | | | | 19.5 | | 0.58 |
| C22:0 | 1.0 | 0.6 | | | 0.1 | 0.78 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 22 | 3 | 3 | 8 | 100 |
| Saturated FA (%) | | | | | | 9.55 |
| Monounsat. FA (%) | | | | | | 57.73 |
| Polyunsat. FA (%) | | | | | | 32.38 |
| Total n-6 FA (%) | | | | | | 27.98 |
| Total n-3 FA (%) | | | | | | 4.40 |
| n-6/n-3 ratio | | | | | | 6.37 |

TABLE 21

| Fatty acids (in %) | HOSFO | SFO | Black-currant oil | Fish oil | Lucerne oil | Mixture |
|---|---|---|---|---|---|---|
| C14:0 | | | | 5.7 | | 0.17 |
| C16:0 | 4.0 | 6.5 | 6.2 | 12.5 | 9.6 | 5.26 |
| C16:1 | | 0.1 | 0.4 | 7.4 | | 0.26 |
| C18:0 | 3.8 | 4.2 | 1.5 | 1.7 | 2.1 | 3.66 |
| C18:1 | 77.4 | 25.5 | 12.9 | 11.7 | 10.9 | 57.05 |
| C18:2 (n-6) | 13.3 | 63.0 | 45.7 | 1.3 | 41.4 | 27.53 |
| C18:3 (n-3) | 0.1 | | 13.9 | 0.9 | 34.0 | 2.55 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.7 | 0.17 |
| C20:1 | 0.2 | | 0.5 | 5.5 | 0.2 | 0.32 |
| C20:5 (n-3) | | | | 19.5 | | 0.58 |
| C22:0 | 1.0 | 0.6 | | | 0.6 | 0.82 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 24 | 3 | 3 | 6 | 100 |
| Saturated FA (%) | | | | | | 10.08 |
| Monounsat. FA (%) | | | | | | 57.75 |
| Polyunsat. FA (%) | | | | | | 31.80 |
| Total n-6 FA (%) | | | | | | 28.03 |
| Total n-3 FA (%) | | | | | | 3.77 |
| n-6/n-3 ratio | | | | | | 7.43 |

TABLE 22

| Fatty acids (in %) | HOSFO | SFO | Black-currant oil | Fish oil | Lucerne oil | Mixture |
|---|---|---|---|---|---|---|
| C14:0 | | | | 5.7 | | 0.17 |
| C16:0 | 4.0 | 6.5 | 6.2 | 12.5 | 9.6 | 5.32 |
| C16:1 | | 0.1 | 0.4 | 7.4 | | 0.26 |
| C18:0 | 3.8 | 4.2 | 1.5 | 1.7 | 2.1 | 3.62 |
| C18:1 | 77.4 | 25.5 | 12.9 | 11.7 | 10.9 | 56.76 |
| C18:2 (n-6) | 13.3 | 63.0 | 45.7 | 1.3 | 41.4 | 27.09 |
| C18:3 (n-3) | 0.1 | | 13.9 | 0.9 | 34.0 | 3.23 |
| C18:3 (n-6) | | 0.1 | 15.7 | 0.2 | | 0.50 |
| C18:4 (n-3) | | | 3.0 | 3.5 | | 0.20 |
| C20:0 | 0.2 | | | 0.1 | 0.7 | 0.19 |
| C20:1 | 0.2 | | 0.5 | 5.5 | 0.2 | 0.32 |
| C20:5 (n-3) | | | | 19.5 | | 0.58 |
| C22:0 | 1.0 | 0.6 | | | 0.6 | 0.82 |
| C22:1 | | | | 4.0 | | 0.12 |
| C22:5 (n-3) | | | | 2.6 | | 0.08 |
| C22:6 (n-3) | | | | 12.2 | | 0.37 |
| % Oil | 64 | 22 | 3 | 3 | 8 | 100 |
| Saturated FA (%) | | | | | | 10.12 |
| Monounsat. | | | | | | 57.46 |

TABLE 22-continued

| Fatty acids (in %) | HOSFO | SFO | Blackcurrant oil | Fish oil | Lucerne oil | Mixture |
|---|---|---|---|---|---|---|
| FA (%) Polyunsat. | | | | | | 32.05 |
| FA (%) Total n-6 FA (%) | | | | | | 27.59 |
| Total n-3 FA (%) | | | | | | 4.45 |
| n-6/n-3 ratio | | | | | | 6.20 |

Example 23

Milk powder

A whole milk powder containing 28% fats is prepared using a mixture of 50% anhydrous milk fats and 50% of the lipidic composition of Example 1 as the fatty phase. After UHT pasteurization of a skimmed milk and concentration by evaporation to 40% dry matter, the fatty phase separately pasteurized by UHT is added, the mixture is homogenized and nitrogen is injected into the homogenized mixture which is then spray-dried under moderate conditions.

We claim:

1. An edible fatty acid triglyceride mixture, wherein the fatty acids of the triglycerides comprise:

from 50% to 70% by weight monosaturated fatty acids, wherein the monosaturated fatty acids comprise from 50% to 65% by weight C18:1;

up to 10% by weight saturated fatty acids, wherein the saturated fatty acids comprise from 3% to 8% by weight C16:0 and from 1% to 5% by weight C18:0; and from 30% to 40% by weight polyunsaturated fatty acids, wherein the polyunsaturated fatty acids comprise from 20% to 35% by weight C18:2; from 0.2% to 1% by weight C18:3,n-6; from 1.5% to 4% by weight C18:3, n-3;

from 0.1% to 0.5% by weight C18:4,n-3; from 0.2% to 1% by weight C20:5,n-3; and from 0.1% to 0.8% by weight C22:6,n-3;

wherein 25% to 35% by weight of the fatty acids of the triglycerides are n-6 fatty acids and wherein the weight ratio of n-6 to n-3 fatty acids is from 4.5:1 to 8.5:1.

2. A triglyceride mixture according to claim 1 which comprises:

from 45% to 68% by weight of a member selected from the group consisting of hybrid sunflower oil, hybrid safflower oil rich in oleic acid, olive oil, apricot oil and olein fractions;

from 8% to 28% by weight of a member selected from the group consisting of sunflower oil, grapeseed oil, passion flower oil, tomato oil and safflower oil;

from 1% to 10% by weight of a member selected from the group consisting of evening primrose oil, borage oil and blackcurrant seed oil;

from 1% to 8% by weight fish oil; and from 2% to 30% by weight of a member selected from the group consisting of rapeseed oil, linseed oil, kiwi oil, lucerne oil, chia oil and rosa mosqueta oil.

3. A triglyceride mixture according to claim 1 which comprises 45% to 68% by weight hybrid sunflower oil.

4. A triglyceride mixture according to claim 1 which comprises from 45% to 68% hybrid sunflower oil, from 8% to 28% by weight sunflower oil, from 1% to 10% by weight blackcurrant seed oil, from 1% to 8% by weight fish oil and from 2% to 30% by weight rapeseed oil.

5. A food composition comprising a food and from 1% to 80% by weight of an edible triglyceride mixture, wherein the fatty acids of the triglycerides comprise:

from 50% to 70% by weight monounsaturated fatty acids, wherein the monounsaturated fatty acids comprise from 50% to 65% by weight C18:1;

up to 10% by weight saturated fatty acids, wherein the saturated fatty acids comprise from 3% to 8% by weight C16:0 and from 1% to 5% by weight C18:0; and from 30% to 40% by weight polyunsaturated fatty acids, wherein the polyunsaturated fatty acids comprise from 20% to 35% by weight C18:2; from 0.2% to 1% by weight C18:3,n-6; from 1.5% to 4% by weight C18:3, n-3; from 0.1% to 0.5% by weight C18:4,n-3; from 0.2% to 1% by weight C20:5,n-3; and from 0.1% to 0.8% by weight C22:6,n-3;

wherein 25% to 35% by weight of the fatty acids of the triglycerides are n-6 fatty acids and wherein the weight ratio of n-6 to n-3 fatty acids is from 4.5:1 to 8.5:1.

6. A food composition according to claim 5 which comprises from 5% to 60% by weight of the edible triglyceride mixture.

7. A food composition according to claim 5 wherein the triglyceride mixture comprises:

from 45% to 68% by weight of a member selected from the group consisting of hybrid sunflower oil, hybrid safflower oil rich in oleic acid, olive oil, apricot oil and olein fractions;

from 8% to 28% by weight of a member selected from the group consisting of sunflower oil, grapeseed oil, passion flower oil, tomato oil and safflower oil;

from 1% to 10% by weight of a member selected from the group consisting of evening primrose oil, borage oil and blackcurrant seed oil;

from 1% to 8% by weight fish oil; and from 2% to 30% by weight of a member selected from the group consisting of rapeseed oil, linseed oil, kiwi oil, lucerne oil, chia oil and rosa mosqueta oil.

8. A food composition according to claim 5 wherein the triglyceride mixture comprises 45% to 68% by weight hybrid sunflower oil.

9. A food composition according to claim 5 wherein the triglyceride mixture comprises from 45% to 68% hybrid sunflower oil, from 8% to 28% by weight sunflower oil, from 1% to 10% by weight blackcurrant seed oil, from 1% to 8% by weight fish oil and from 2% to 30% by weight rapeseed oil.

10. A food composition according to claim 5 wherein the food is a milk-based product.

11. A food composition according to claim 5 wherein the food is a milk powder.

* * * * *

UNITED STATES PATENT AND TRADEMARK OFFICE
CERTIFICATE OF CORRECTION

PATENT NO. : 5,518,753
DATED : May 21, 1996
INVENTOR(S) : Umberto BRACCO, et al.

It is certified that error appears in the above-identified patent and that said Letters Patent is hereby corrected as shown below:

On the title page, in line 6 of the ABSTRACT, "C18:,n-3;" should be --C18:3,n-3--.

Column 15, in each of lines 31 and 32 (lines 3 and 4 of claim 1), each occurrence of :monosaturated" should be --monounsaturated--.

Signed and Sealed this

Sixth Day of August, 1996

Attest:

BRUCE LEHMAN

Attesting Officer         Commissioner of Patents and Trademarks